Nov. 13, 1945.  R. THOMPSON  2,388,772
TAMPER FOR CIGARETTE MACHINE FEEDERS
Filed Nov. 9, 1942     3 Sheets-Sheet 1
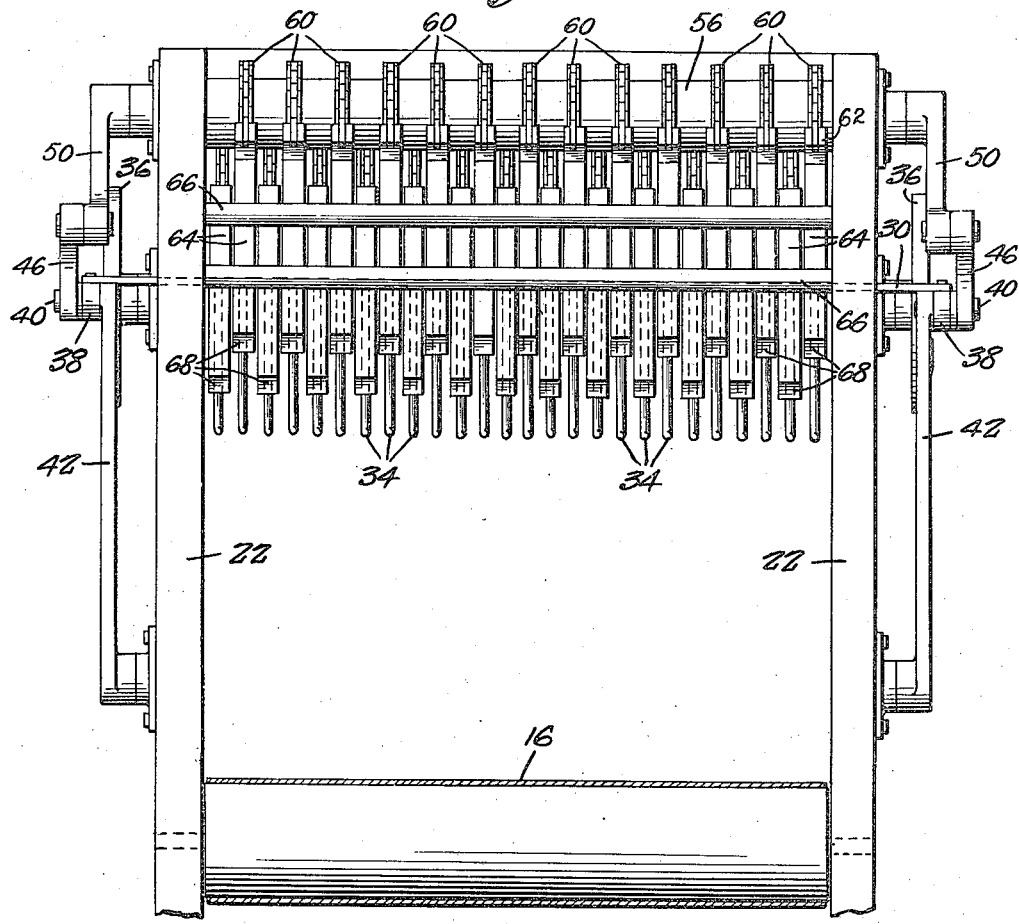
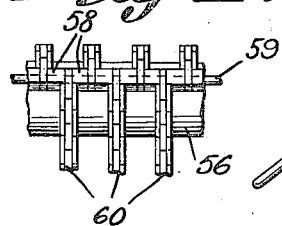
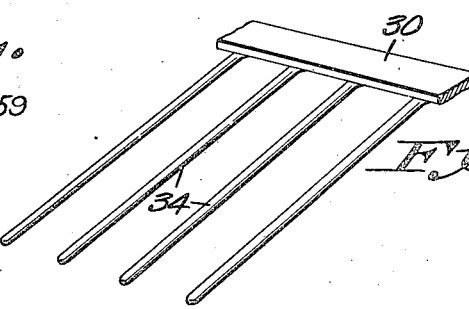
INVENTOR,
Ross Thompson
BY
Victor J. Evans & Co.
ATTORNEYS

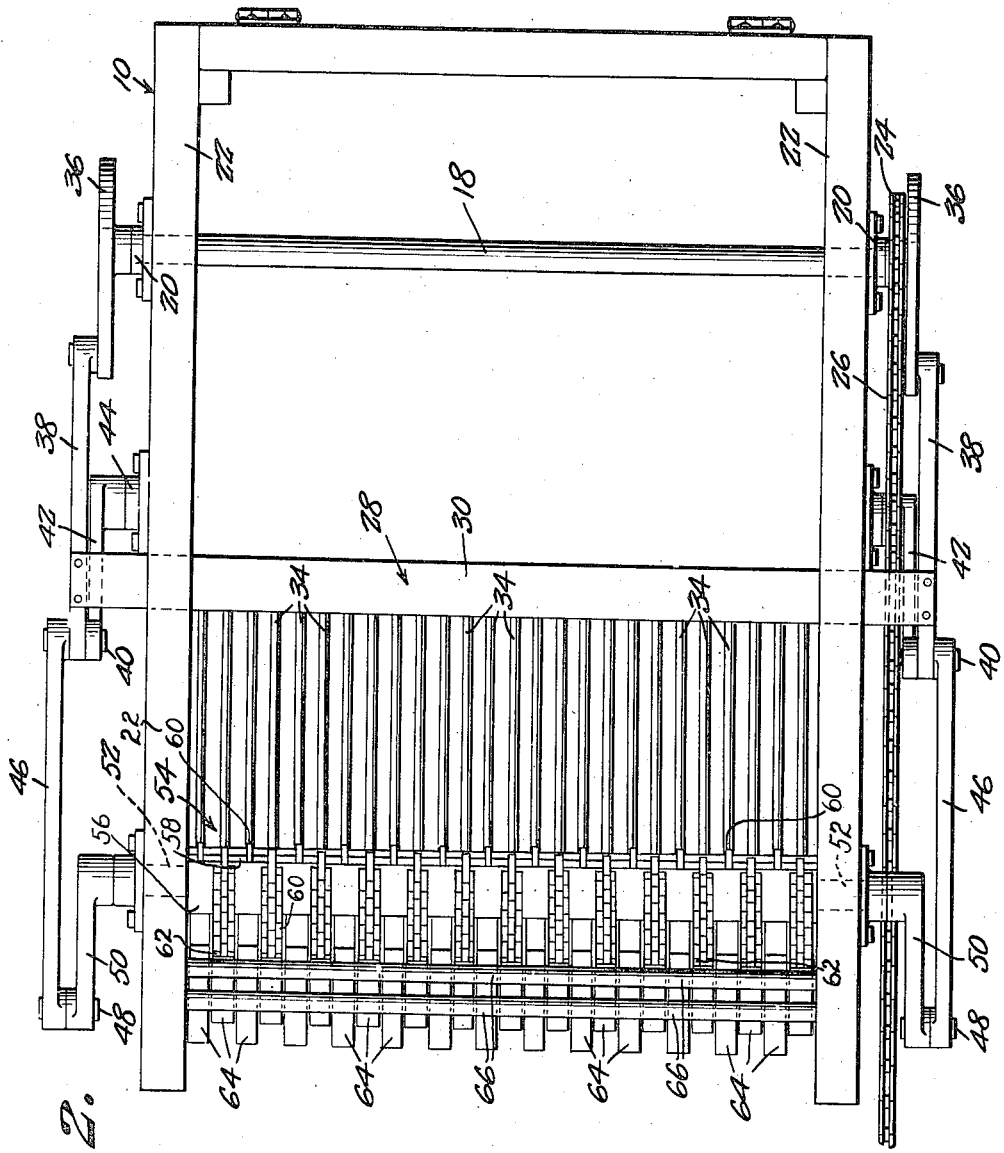

Ross Thompson,
INVENTOR.

Patented Nov. 13, 1945

2,388,772

UNITED STATES PATENT OFFICE 2,388,772

TAMPER FOR CIGARETTE MACHINE FEEDERS

Ross Thompson, Durham, N. C., assignor of one-third to H. D. Armstrong

Application November 9, 1942, Serial No. 465,043

4 Claims. (Cl. 131—109)

My invention relates to cigarette making machines, and has among its objects and advantages the provision of an improved tobacco regulator designed to operate in conjunction with the drums of the feeder.

In the accompanying drawings:

Figure 1 is an end view taken on line 1—1 of Figure 3 with the drums removed.

Figure 2 is a top view taken on line 2—2 of Figure 3 with the drums removed.

Figure 4 is a fragmentary detail view of regulating weight operating means, and

Figure 5 is a perspective view of a portion of a tobacco rake.

Figure 3:
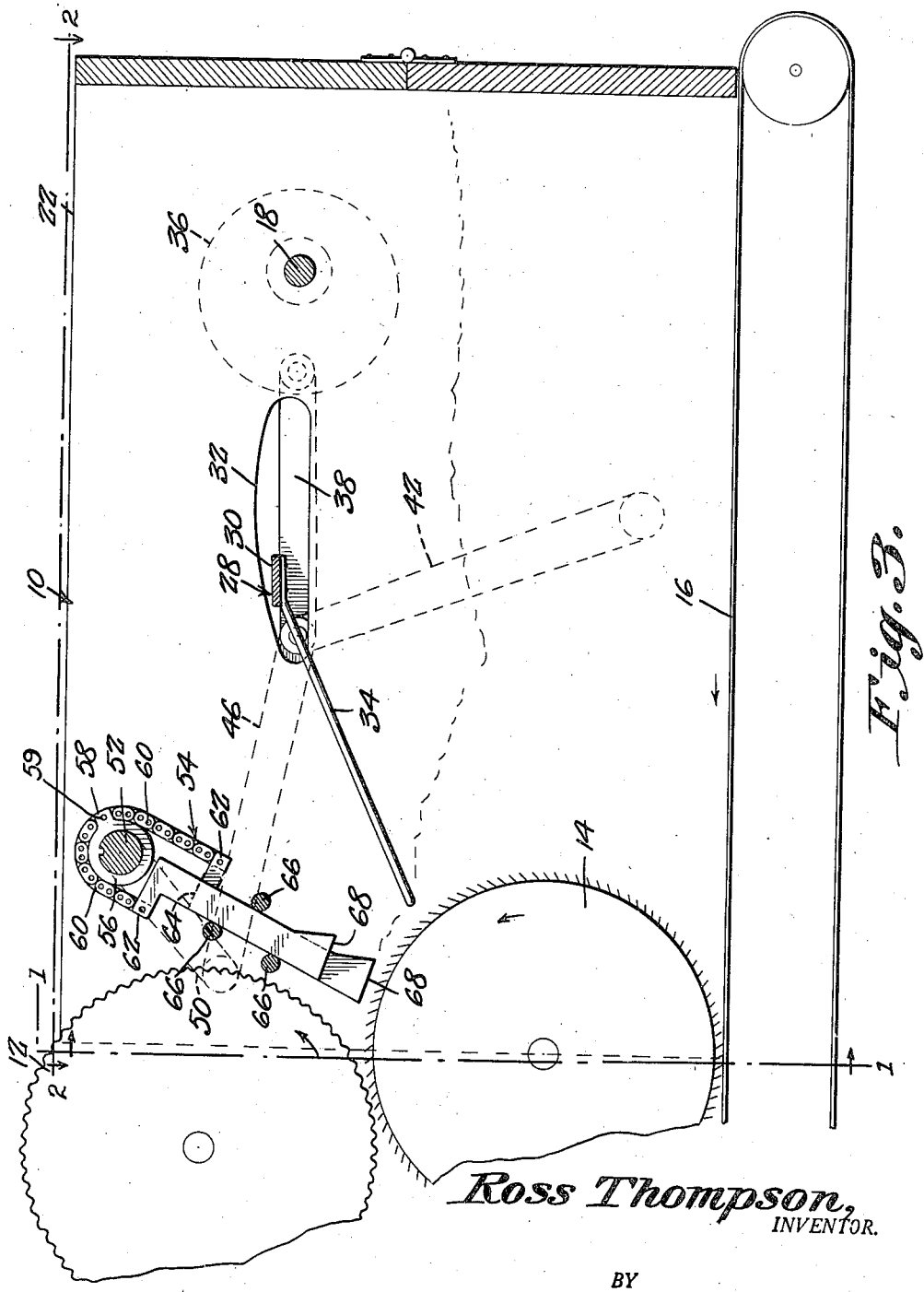
Figure 3 is a longitudinal sectional view.

In the embodiment of the invention selected for illustration, I make use of a hopper 10, refuser drum 12 and feeder drum 14 for delivering the tobacco to the cigarette making machine. A conveyor 16 underlies the hopper 10 and extends underneath the drum 14. The drums 12 and 14 rotate counterclockwise, as when viewing Figure 3. The structure so far described is old and well known in the art.

A horizontal shaft 18 extends through the hopper 10 and is supported in bearings 20 mounted on the side walls 22 of the hopper. A sprocket 24 is fixed to the shaft 18 and connected with a driven chain 26.

Extending transversely of the hopper 10 is a rake unit 28 comprising a horizontal beam 30 extending through openings 32 in the side walls 22. Rake tines 34 are attached to the beam 30. This beam may comprise an iron bar having the tines 34 welded thereto. Figure 3 illustrates the tines 34 as lying in a common plane declining downwardly and in the direction of the drum 14. This view illustrates the tines 34 as terminating a short distance from the periphery of the drum 14, the tines being in their extreme forward position.

Two disks 36 are fixed to the ends of the shaft 18. A lever 38 is connected at one end with each disk 36, the other end of the lever being pivotally connected with a pin 40 to which the upper end of a lever 42 is also pivotally connected. The levers 42 are pivotally supported at their lower ends in bearings 44 attached to the side wall 22. The beam 30 is fixedly secured to the two levers 38.

To each pin 40 is pivotally connected one end of a lever 46. The opposite ends of the levers 46 are pivotally connected at 48 with arms 50 fixed to a packer shaft 52, best illustrated in Figure 3. The shaft 18 rotates clockwise when viewing Figure 3. Because of such rotation, the levers 42 oscillate and lift the bar 30 and its tines 34 on the return stroke of the rake unit 28. Forward motion of the rake unit is characterized by a downward and upward movement as it is moved in the direction of the drum 14. All the tines 34 are spaced equal distances apart.

Upon the shaft 52 is mounted a tobacco packer mechanism 54. This mechanism comprises a pipe 56 keyed to the shaft 52 and provided with a plurality of lugs 58. These lugs are spaced equal distances apart longitudinally of the pipe 56, and the length of the pipe extends substantially the full width of the hopper. Through the lugs is extended a rod 59 disposed for extension through the inner apertured ends of the inner links of a multiplicity of chains 60 having their opposite outer ends connected with lugs 62 formed on the upper ends of the plurality of elongated weight bars 64. These weights are equally spaced and of equal weight. All the weights also lie in a common plane, as when viewing Figure 3, with the plane of the weights arranged substantially radially of the axis of the drum 14. The chains 60 are alternately reversed so that half the weights 64 move upwardly as the other half move downwardly. These weights are slidably guided in three cross rods 66 extending transversely of the hopper 10 and attached to the side walls 22. One rod 66 engages underneath the weights and the remaining rods engage the opposite edges of the weights, with the plane of the weights inclined slightly to the vertical, so that their widened ends 68 are presented flatwise to the tobacco packed against the drum 14.

Obviously the size of the hopper may be varied as well as the number of weights 64, depending upon the size of the feeder.

Since the pipe 56 is keyed to the shaft 52, the pipe operates with a rocking motion for imparting reciprocatory motion to the weights 64. These weights pack the tobacco uniformly so that cigarettes made therefrom are of uniform compactness. In a hopper of the type illustrated, the rake tines 34 may advantageously correspond in number to the number of weights 64. The tines 34, by reason of the oscillatory movement of the rake, move forwardly and then rearwardly with relation to the weights 64 and the upper portion of the drum 14. During their forward movement, the tines 34 move the tobacco to the weights 64 and the upper portion of the drum 14, and during their rearward movement they move the excess tobacco to the back of the hopper, whereby to enable the weights to hold the same amount of tobacco, in width and depth, at all times on the upper portion of the drum. At the same time, the uniformity characterizing the cigarettes eliminates a large amount of rerunning of imperfectly formed cigarettes.

Without further elaboration, the foregoing will so fully explain my invention, that others may, by applying current knowledge, readily adapt the same for use, under various conditions of service.

I claim:

1. In a cigarette making machine having a rotary feed drum, a set of elongated weight bars supported for longitudinal reciprocating movement in a path approximately radial of the drum axis for tamping tobacco with reference to the drum, a shaft, means for oscillating the shaft, a pipe on the shaft, lugs on the pipe, and a chain connected with each of the lugs, said lugs and chains being alternately positioned to each side of the longitudinal axis of the shaft, and the chains connected to alternate weight bars for reciprocating alternate weight bars of the set in reverse directions.

2. In a cigarette making machine having a rotary feed drum, a set of elongated weight bars supported for longitudinal reciprocating movement in a path radially of the drum and acutely inclined from the vertical, and rocker mechanism including flexible means connected with alternate weight bars on opposite sides of the axis of the weight bars and operable to reciprocate alternate weight bars of the set in reverse directions.

3. In a cigarette making machine having a rotary feed drum, a set of elongated weight bars supported for longitudinal reciprocating movement in a path approximately radial of the drum axis for tamping tobacco with reference to the drum, and a rock shaft and flexible elements attached to and extending over opposed sides of the rock shaft for connecting the weight bars to the shaft.

4. In a cigarette making machine having a rotary feed drum, a set of elongated weight bars mounted for longitudinal reciprocating movement in a path acutely inclined from the vertical and adjacent the drum, a reciprocating rake bar, and a multiplicity of tines fixed to the rake bar and directed at a downward inclination converging toward the weight bars for movement toward and away from the drum.

ROSS THOMPSON.